United States Patent [19]
Zonge

[11] 3,967,190
[45] June 29, 1976

[54] METHOD USING INDUCED POLARIZATION FOR ORE DISCRIMINATION IN DISSEMINATED EARTH DEPOSITS

[76] Inventor: Kenneth L. Zonge, 5634 E. Pima, Tucson, Ariz.

[22] Filed: Dec. 23, 1974

[21] Appl. No.: 535,999

[52] U.S. Cl. .......................................... 324/1; 324/9
[51] Int. Cl.² ............................................. G01V 3/06
[58] Field of Search .................................. 34/6, 9, 1

[56] References Cited
UNITED STATES PATENTS

| | | | |
|---|---|---|---|
| 2,988,690 | 6/1961 | Love et al. ................................ | 324/1 |
| 3,382,428 | 5/1968 | Sherwood et al. ...................... | 324/9 |
| 3,701,940 | 10/1972 | Nilsson ............................... | 324/9 X |
| 3,849,722 | 11/1974 | Nilsson ................................. | 324/9 |

*Primary Examiner*—Gerard R. Strecker
*Attorney, Agent, or Firm*—William J. Miller

[57] ABSTRACT

A method for establishing data related to the complex resistivity of selected subsurface earth deposits whereby increased discrimination and identification of ore deposits is established. The method utilizes induced polarization in the earth with establishment of both time domain and frequency domain data and correlation of such data with an analog equivalent circuit of the earth section to derive a value closely approximating the complex resistivity of the selected earth substructure thereby to provide more discriminating data enabling determination of the percentages and types of sulphide ore deposits.

8 Claims, 12 Drawing Figures

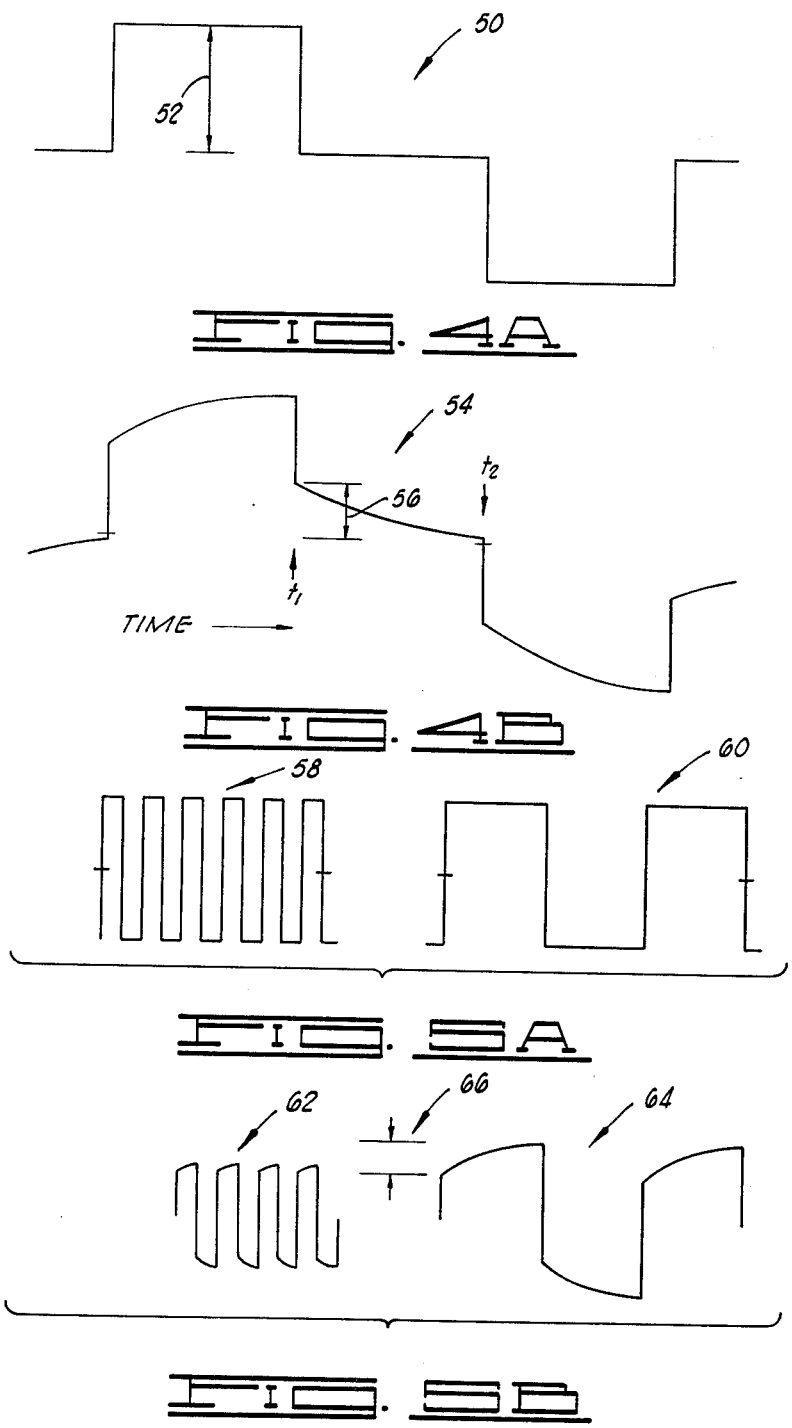

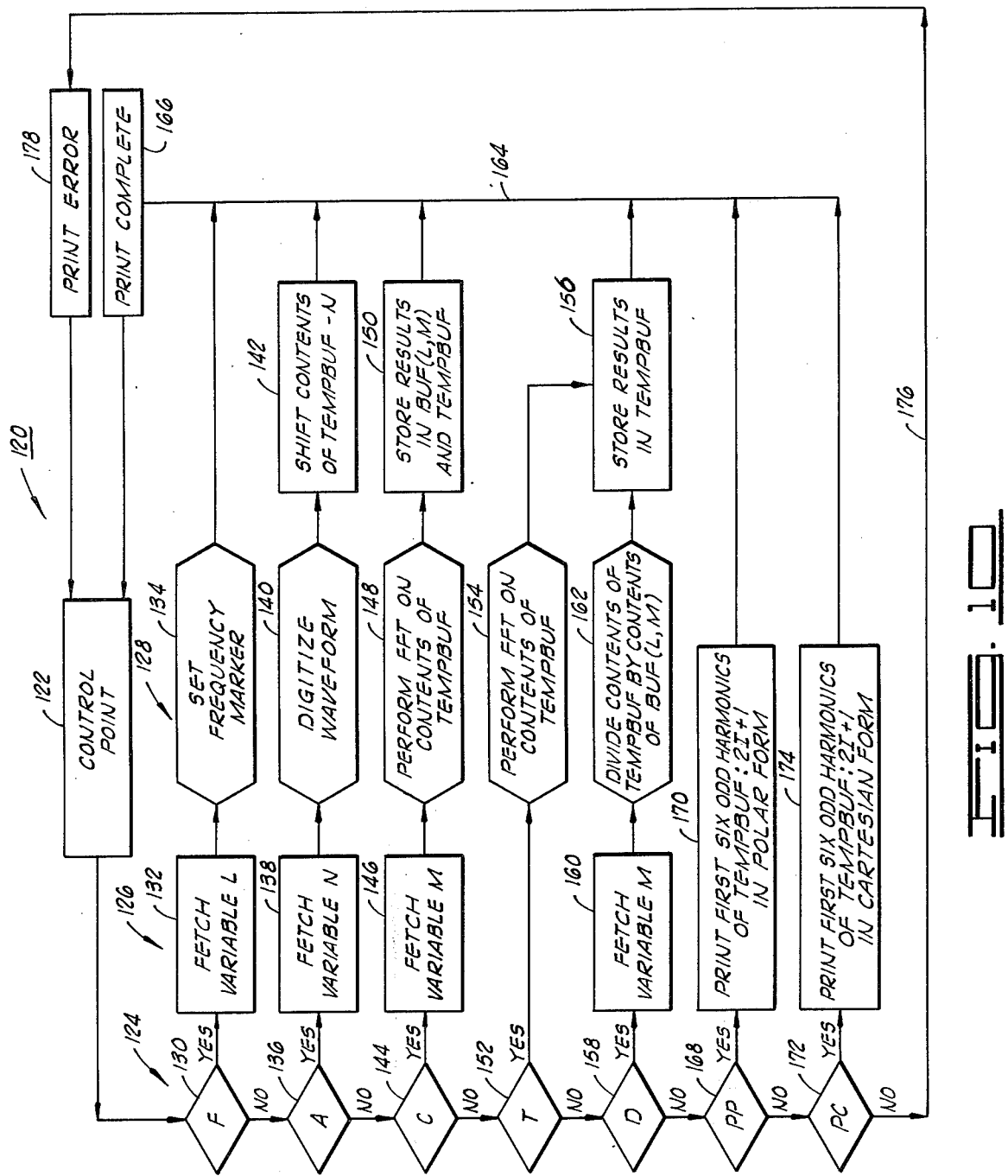

METHOD USING INDUCED POLARIZATION FOR ORE DISCRIMINATION IN DISSEMINATED EARTH DEPOSITS

BACKGROUND OF THE INVENTION

1. Field of the Invention

The invention relates generally to induced polarization prospecting methods and, more particularly, but not by way of limitation, it relates to an improved data evaluation system wherein complex resistivity of the earth's substructure is established to provide more definitive output indication.

2. Description of the Prior Art

The prior art includes numerous types of induced polarization systems, many basic types of which have been utilized in geophysical prospecting for a number of years. Field techniques have not changed greatly since the first induced polarization survey was run except that equipment has been vastly improved, becoming more compact, more reliable, and more sensitive; however, induced polarization still utilizes basically the same type of field array as is used in general resistivity survey and such resistivity survey has been practiced since about 1920.

In the field, there are presently practiced two basic types of induced polarization surveying, i.e. time domain and frequency domain surveying. In time domain practice, the method entails pulsing the ground with a symmetrical wave form which is 50% on/off, on times varying from two to ten seconds with equal off times. In this method, the measured parameters of interest are the areas under the established discharge curves from which additional parameters as to chargeability may be obtained. In the frequency domain method IP measurements are made at two different frequencies, usually a decade apart, with measurement of a parameter equal to the steady state voltage response which is then reduced to the frequency effect parameter, well known in IP survey data analysis. None of the presently employed techniques provide data indicating other than near-anomalous regions and thus far it has not been possible to make deterministic measurements utilizing the known IP methods.

SUMMARY OF THE INVENTION

The present invention contemplates as improved IP surveying method wherein earth subsurface complex resistivity is established utilizing an equivalent circuit technique, and complex resistivity data is reduced to a more definitive data rendering indicating the precentage and types of sulphides, i.e. sulphides of iron, copper, nickel, and molybdenum, etc. In a more limited aspect, the invention consists of a remote sensing method to discriminate between different mineralization types by (1) defining the parameters in rocks which determine the impedance of the frequency range D-C to 1000 Hz; (2) developing a realistic electric analog circuit relative to the subterrain; (3) measuring the actual transfer function of the rock deposit; (4) equating the rock transfer function to the electric analog transfer function and thereafter deriving the actual analog circuit parameters; and (5) graphically relating the derived parameters to the content of the rock undergoing analysis.

Therefore, it is an object of the present invention to provide a method wherein actual types and percentages of selected metallic ores are established for a given earth terrain.

It is also an object of the invention to provide a method for establishing the complex A-C resistivity of a selected earth section for comparison to prior established complex resistivity data to identify ore deposits.

Finally, it is an object of the present invention to provide a method of induced polarization surveying wherein both time domain and frequency domain data are derived for subsequent reduction to complex resistivity of the terrain, and such complex resistivity measurement provides actual electrical response of the subterrain under polarization.

Other objects and advantages of the invention will be evident from the following detailed description when read in conjunction with the accompanying drawings which illustrate the invention.

BRIEF DESCRIPTION OF THE DRAWINGS

FIG. 4A is a time domain current input wave form;

FIG. 4B is a time domain received voltage response wave form;

FIG. 5A are frequency domain current input wave forms at respective lower and higher frequencies;

FIG. 5B are frequency domain received voltage response wave forms at the respective lower and higher frequencies.

FIG. 10 is a general flow diagram of one form of computer program as utilized in the system of FIG. 9.

DETAILED DESCRIPTION OF THE PREFERRED EMBODIMENT

Figure 1:
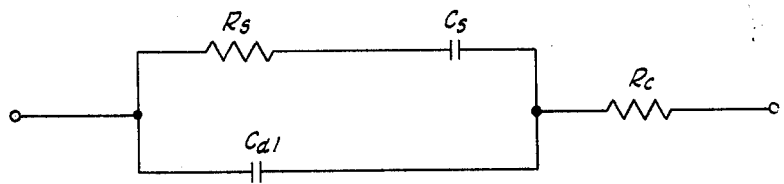
FIG. 1 is a schematic drawing of an equivalent circuit for mass-transfer controlled polarized electrode-solution interface.

The present invention is directed to a remote sensing method of induced polarization (IP) wherein a causal or deterministic relationship is established between a known anomalous response and the area under investigation. Current field practice in IP gives little more than approximate location and rough indication of sulphide content of anomalous sources in the ground. The sulphide content is subject to the greatest error since anomalies and anomaly magnitudes can be affected by many factors; e.g. electrode geometry and environment, electrical anisotropy, electromagnetic coupling, etc., and the anomaly itself can be caused by graphites, clays, or as in most cases, by pyrites, which are relatively worthless economically. The present invention develops an electrical analog model based upon electrochemical considerations, and thereafter performs petrologic correlation between the model and (CR)-sensed parameters in order to ascertain with greater certainty the quantities and types of ores lying in the subsurface.

Laboratory measurements show that wet rock materials usually display linear electrical characteristics when the excitation current density is kept very low, i.e. typically below 0.1 microampere per centimeter squared. In this sense, linearity indicates the electrical response of the rock as being directly proportional to the electrical input in both amplitude and frequeny. Thus, given both the input function and an output function, the electrical characteristics of geologic material can be defined in terms of a transfer function.

In the case of induced polarization data, the input parameter is current and the measured output parameter is voltage. Therefore, the transfer function is a transfer impedance. The transfer impedance of rock materials can be measured directly using sinusoidal current excitation and monitoring the phase and amplitude of the resulting voltage response. If this is done at several different frequencies, an impedance spectrum is generated, displaying the frequency characteristics of a particular rock type. These frequency signatures can then be used to describe the electrical characteristics of the rock material. In the present method, particular rock substances are described in terms of diagnostic impedance parameters which serve to synthesize transfer impedances of different rock types with equivalent circuits composed of discrete and distributed linear, passive elements.

The predominant cause of induced electrical polarization is due to electrochemical activity at metallic mineral-electrolyte interfaces within the subsurface. Ion absorption, electron transfer, ion diffusion, electrode double layer capacitance, etc., all contribute to the complex impedances measured in wet mineralized rocks. Thus, beginning with a single electrode, i.e. a metallic-luster mineral in contact with an electrolyte or pore fluid, there is developed a linearization of the electrochemical equations for small current densities with subsequent derivation of a general equation for the IP response of disseminated ore types. In arriving at this relationship, it is initially assumed that the Nernst equation describing electrochemical equilibrium conditions and the Ficks equations for linear diffusion are valid.

It can then be shown for a single electrode system that the steady state sinusoidal voltage-current relationship is $$\eta = -I \frac{RT}{nF} \left\{ \left[ \frac{1}{i_0} + \frac{1}{\sqrt{2\omega nF}} \left( \frac{1}{C_{ox}D_{ox}^{1/2}} + \frac{1}{C_{red}D_{red}^{1/2}} \right) \right] \sin \omega t + \frac{1}{\sqrt{2\omega nF}} \left[ \frac{1}{C_{ox}D_{ox}^{1/2}} + \frac{1}{C_{red}D_{red}^{1/2}} \right] \cos \omega t \right\} \quad (1)$$

1. Where n equals electrochemical overvoltage, I equals current, R equals gas constant, T equals absolute temperature in degrees Kelvin, F equals Faraday's constant, $n$ equals number of electrons or ion valence, $i_0$ equals equilibrium or exchange current, $C_{ox}$, $C_{red}$ equals bulk concentration of exidant or reductant species, $D_{ox}$, $D_{red}$ equals diffusion constant, and $\omega$ equals angular frequency.

Equation (1) can then be rewritten as $$\eta = -I \left( R_s + \frac{1}{j\omega C_s} \right) \sin \omega t \quad (2)$$

2. Where $R_s$ is the Faradaic resistance and $C_s$ is the Faradaic capacitance for a series representation of the Faradaic impedance. It may be noted that $R_s$ is equal to $R_{ct} + R_w$ where $R_{ct}$ is a charge transfer resistance and $R_w$ is commonly called the Warburg resistance. Also, $R_w + 1 \div j\omega C_s$ is the total Warburg impedance which is due to diffusion or mass-transfer at the electrode/electrolyte interface.

If the effect of absorbed and electrostatically attracted ions at this theoretical interface are taken into account, an equivalent circuit for a single electrode/electrolyte interface at a single frequency can be developed such as that shown in FIG. 1 where the capacitance $C_{dl}$ is the so-called double layer capacitance and $R_c$ is the bulk resistivity of the electrolyte.

Expanding the equation (2) to include all frequencies within selected limits, the general impedance function for a single electrode is found to be $$Z = \frac{2Z_w + R_{ct}}{pC_{dl}(2Z_w + R_{ct}) + 1} \quad (3)$$

Where $Z_w$ equals the Warburg impedance, $R_{ct}$ equals charge transfer impedance, $C_{dl}$ equals double layer capacitance, p equals complex frequency operator which, in turn, can be equated to $j\omega$ in the steady state.

Figure 2:
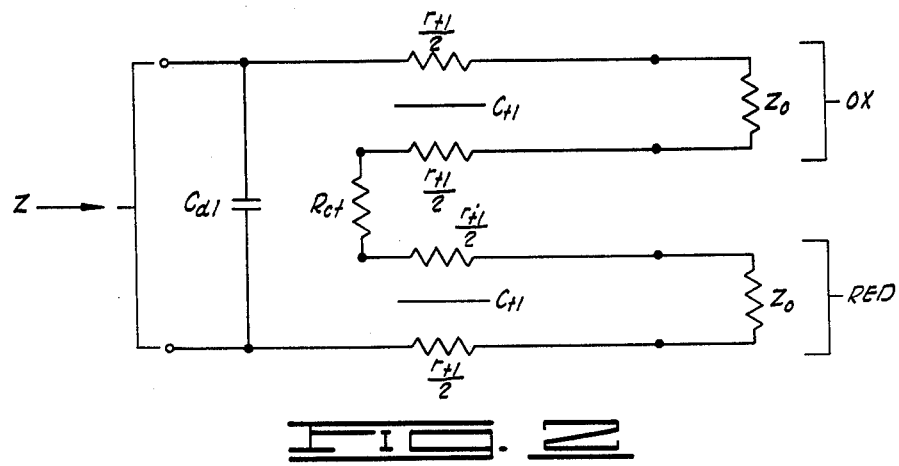
FIG. 2 is a schematic diagram of an equivalent circuit used in deriving the induced polarization impedance function for polarizable rock terrain.

The equivalent circuit of this impedance function is shown in FIG. 2. Performance of the present method utilizes the equivalent circuit of FIG. 2 in deriving the IP impedance function for polarizable rocks.

The impedance function may be further stated as $Z = (2Z_o + R_{ct})$ in parallel with $C_{dl}$. It thus follows that the Warburg resistance and Faradaic capacitance are equatable as $$R_w = \sqrt{\frac{r_{dl}}{2\omega C_{dl}}} \quad (4)$$

and $$C_s = \sqrt{\frac{2C_{dl}}{\omega r_{dl}}} \quad (5)$$

By combining an infinite number of electrode/electrolyte systems in a rock matrix to fabricate a disseminated ore type, it can be shown that the general impedance function of interest relative to IP measurement is $$Z = \frac{R_{dc}}{(N+1)\theta}(N\theta + \tan h \, \theta) \quad (6)$$

Where $R_{dc}$ equals tru dc resistivity, N equals the ratio of unblocked to blocked pore-spaces, and $\Theta$ is equal to $$\theta = \sqrt{\frac{(N+1)R_{dc}}{2Z}} \quad (7)$$

Measured frequency domain data can be matched to equation (6) by expressing the equation in the form of an equivalent circuit and curve matching the induced polarization output data with the equivalent circuit output data. The variable parameters of interest relative to these equivalent representations are: $N$, $C_{dl}$, $R_{dc}$, $R_{ct}$, and the Warburg admittance factor $K$.

Definitions of parameters used in this section:

$i_o$ = equilibrium exchange current = $nFAK°C$ for $C = C_{ox} = C_{red}$ $k°$ = formal chemical rate constant $$R_{ct} = \frac{RT}{nF\,i_o}, \text{ charge transfer resistance}$$

$$R_w = \frac{RT}{n^2 f^2 \sqrt{2\omega}} \left[ \frac{1}{C_{ox}\,D_{ox}^{1/2}} + \frac{1}{C_{red}\,D_{red}^{1/2}} \right], \text{ Warburg resistance}$$

$1/\omega C_s = R_w$, Warburg capacitive reactance $Z_w = R_w + 1/\omega C_s$, Warburg impedance $C_{dl}$ = Double layer capacitance, a function of voltage, particle size, number, and pore fluid $R_{dc}$ = dc resistivity of electrolyte, a function of free ion mobility and density $$K = \frac{n^2 F^2 C D^{1/2}}{4\,RT} \text{ for } C = C_{ox} = C_{red},\ D = D_{ox} = D_{red},$$

called the Warburg admittance factor and is also a function of pore diameter (i.e., pore diameter effects $D$)

$$N = \frac{R_{ac}}{R_{dc} - R_{ac}}$$

which is the inverse of the frequency effect (FE) in the limit, also equal to the ratio of unblocked to blocked pore paths $$R_{ac} = \frac{NR_{dc}}{N+1}$$

$$\theta = \sqrt{\frac{(N+1)\,R_{dc}}{2}}\ \frac{KC_{dl}\,R_{ct}\,P^{3/2} + C_{dl}P + K_p^{1/2}}{K\,R_{ct}\,P^{1/2} + 1} \tag{8}$$

The derived parameters for the equivalent circuit of FIG. 2 have been correlated with actual values determined for specific forms of rock samples, and it is now determined that such equivalent circuit and contributing factors are a close approximation of polarization phenomena to be encountered during an induced polarization survey in the field. Thus, the equivalent circuit of FIG. 2 is representative of a complex resistivity, hereinafter also referred to as CR, which may also be referred to as the actual or transfer impedance of rock structure and constitutes an A–C resistance measurement.

Figure 3:
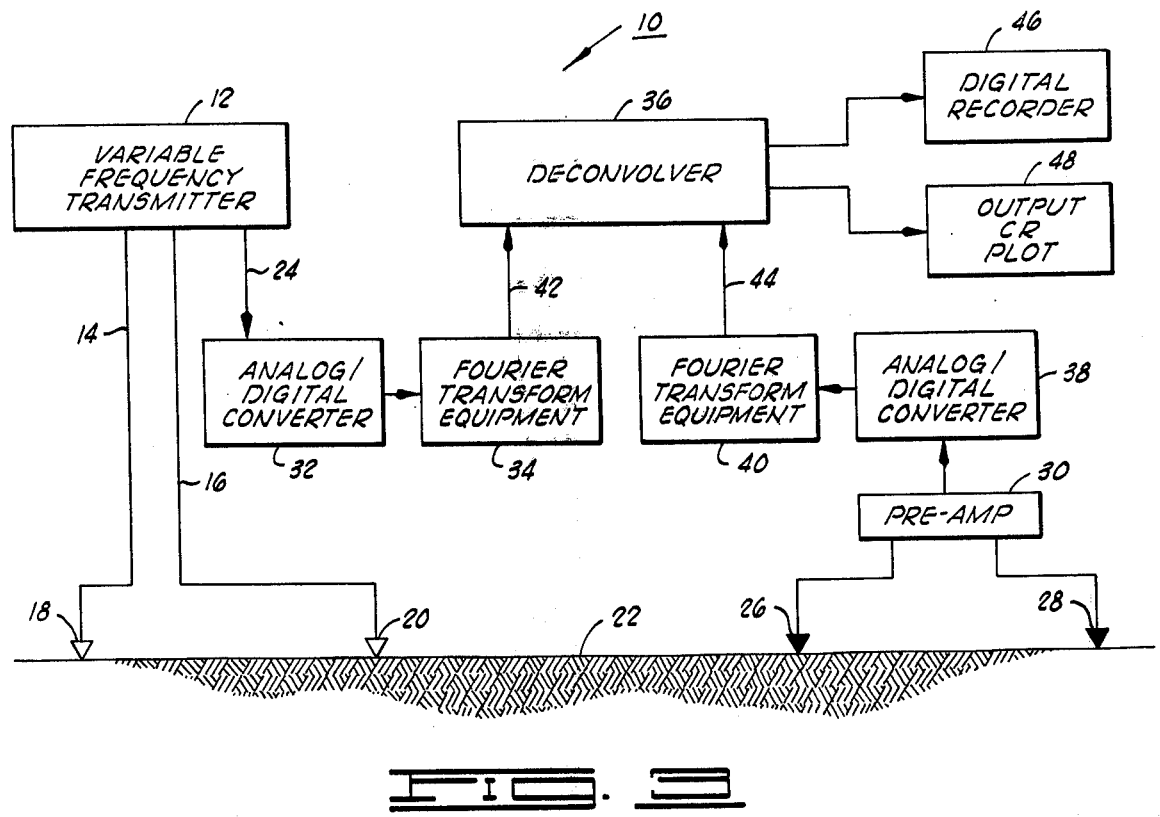
FIG. 3 is a functional block diagram of induced polarization apparatus utilized in carrying out the method of the present invention.

Equipment is now available which can carry out an induced polarization survey and isolate and reduce specific impedance parameters to enable output plotting of the actual A–C resistance or CR indication. That is, the CR data output can be reproduced in cartesian coordinates or vectoral display wherein the real and imaginary components of the A–C impedance of the earth substructure under surveillance is exhibited. FIG. 3 illustrates a basic form of CR survey apparatus 10 which functions in accordance with the present method. A variable frequency transmitter 12 may be any of several well-known types of constant current transmitter. This type of transmitter has been used extensively in prior art induced polarization survey operations and is commercially available or readily designed by the skilled artisan. Variable frequency transmitter 12 functions to provide a square or sine or other repetitive wave output via lines 14 and 16 to respective current electrodes 18 and 20 suitably implanted in earth-coupling connection to earth surface 22. Transmitter 12 is preferably variable between D–C and 1000 Hz for induced polarization applications and may readily be set to provide alternating current output at any selected frequency within the limits. Output via line 24 from transmitter 12 provides replica signal output of the current output produced on lines 14 and 16 for deconvolution purposes, as will be further described below.

Current input to the earth is then sensed by such as potential electrodes 26 and 28, and such sensed electrical potentials are applied to a pre-amp 30 enroute to further processing, as will be described. It should be understood that the basic drawing of FIG. 3 relates to a simple dipole-dipole array of spaced current and potential electrodes, however, in accordance with well-known practices, the method of the present invention may be employed in either downhole electrode arrays, surface electrode arrays, and of varying polar arrangements. In addition, present practice has proven that speed and quantity of data acquisition is much improved when a plurality of spaced potential or current electrodes are employed to derive successive electrode potentials, or potential differences, and this practice is also present in the prior art.

Current induced between electrodes 18 and 20 is sensed by potential electrodes 26 and 28 to provide input to a pre-amplifier 30 which may be a conventional high gain seismic-type amplifier that includes requisite input filtering of sensed signal energy to remove excessive noise and various coupling effects.

The constant current earth input generated by variable frequency transmitter 12 may be on the order of 0.5–10 amperes and within the range of D–C to 1000 Hz frequency, depending upon the desired spectral content of the study. The input replica signal on lead 24 is supplied through a conventional type of analog/digital converter 32 and the digital output is applied to Fourier transform equipment 34 to undergo a Fast Fourier Transform (FFT) process for input to a deconvolver equipment 36. Fourier transform equipment of suitable type is commercially available from numerous manufacturers and suppliers, namely, Texas Instruments, Hewlett-Packard, etc., and Fourier transform equipment 34 functions in normal manner to isolate the relative content of harmonic frequencies present in the input function, i.e. to reduce the input to a spectral function within designated harmonic limits. In the present process, the designation of harmonic limits as well as fundamental input current frequencies will depend upon the amount of frequency spectrum desired. In some cases, this may be 0.1 through 110 Hertz, while in other cases, depending upon terrain, 0.01 through 110 Hertz may be utilized. The Fourier transform output from transform equipment 34 is then applied to a deconvolver equipment 36.

The deconvolver 36 is also a commercially available and readily utilized unit and may be either a specialized digital computation device adapted for specific digital input or it may be a specifically programmed general purpose computer controlled in designated manner. Specialized deconvolution units are commercially available from many of numerous data processing equipment companies, usually as a peripheral device attending operation of a specific computer equipment.

Since potential output from amplifier 30 is also applied to an analog/digital converter 38, similar to converter 32, the digitized signal output is then applied to another similar type of Fourier transform equipment 40 for harmonic analysis and input of signals to deconvolver 36.

In Fourier notation, the input current $I(j\omega)$ and output voltage $V(j\omega)$ are related to the system impedance function $H(j\omega)$ by $$H(j\omega) = \frac{V(j\omega)}{I(j\omega)} \qquad (9)$$

In this case, $H(j\omega)$ is a direct function of the complex resistivity which is being sought. That is, equation (9) states that the complex resistivity spectrum for a given rock sample is obtained by dividing the Fourier transform of the output signal by the Fourier transform of the input signal regardless of their respective wave forms in the time domain. Thus, after Fourier transformation of the respective replica input signal on line 42 and the received potential signal on line 44, the deconvolver 36 effects deconvolution or division of inputs to provide an output function in relative terms of potential magnitude and phase difference. The deconvolution stage 36 performs the well-known function of correlation between the replica input and sensed potential signals over a plurality of selected harmonic frequencies to provide a spectral distribution of such magnitude and phase data. The data output from deconvolver 36, still in the digital form, may then be applied for storage on a conventional form of digital recorder 46, or the output data may be directly presented to an output CR plot apparatus 48 to provide graphic indication of magnitude and phase, i.e. real and imaginary relative values, as will be further discussed below.

Current input generated by transmitter 12 may be either that form of input which is generally termed time domain polarization input (FIGS. 4A and 4B) or that which is commonly termed frequency domain wave form (FIGS. 5A and 5B). These designations stem from prior art systems of time or frequency domain function which require the specific forms of signal; however, the present method can function utilizing either type of input signal with final processing in the frequency domain and, in addition, the present CR method may utilize still other forms of sine waves and other periodic wave functions. FIG. 4A represents what may be termed a conventional form of time domain voltage input, i.e. a step voltage wave form 50 having constant amplitude 52 in both positive and negative directions. The sensed potential wave form 54 of FIG. 4B will have undergone marked form changes, the definitive factor being the decay variation shown by arrow 56 present in each alternate half cycle. The decay voltage 56 is a usual measured parameter in pure time domain survey and is integrated to ascertain the area under the discharge wave curve, i.e. from time $t_1$ to $t_2$.

In pure frequency domain prospecting, input current wave forms at spaced frequencies, such as $f_1$ wave form 58 and $f_2$ wave form 60 of FIG. 5A may be current input to the earth. Sensed potentials may be characteristically altered such as shown by waveforms 62 and 64 of FIG. 5B. The parameter designated by arrows 66 (The amplitude difference between waveforms 62 and 64) tends to be the definitive indicator when analyzed in relation to frequency.

Figure 6:
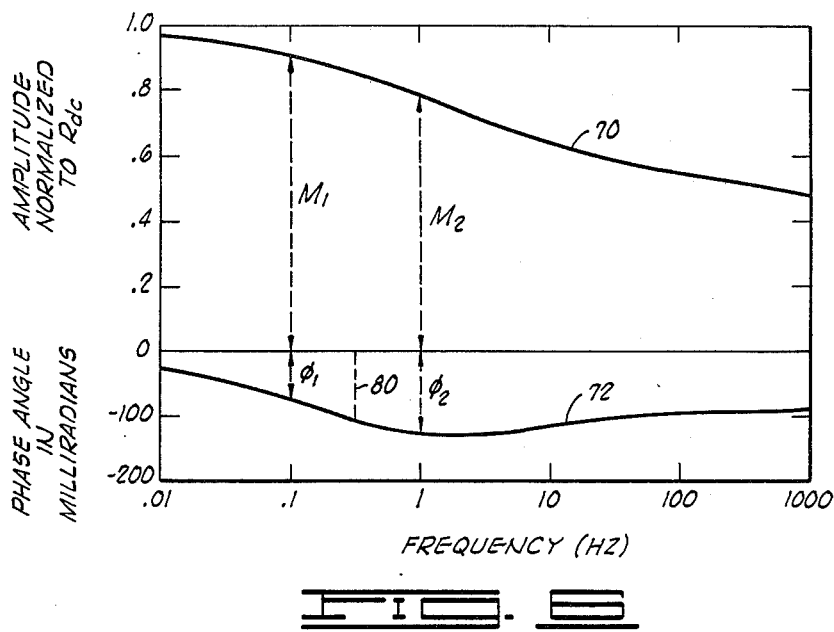
FIG. 6 is a frequency spectrum representation for a specific downhole induced polarization date reading.

The present polarization survey method establishes complex A–C resistivity through Fourier transformation of current input and sensed potential signals over a specified frequency range such that subsequent correlation provides output of amplitude response and phase angle response over the entire spectral range. Output plots of the complex resistivity response take on characteristic signatory shapes at varying frequencies such that much more accurate prediction can be made as to the actual types of minerals or non-minerals and particular sulphide contents in the underlying ore bodies. FIG. 6 illustrates one form of output from deconvolver 36 over the frequency range 0.01 Hz to 1000 Hz. In this instance, the variably frequency transmitter 12 may have provided input at 0.01 Hz for a time sufficient to establish good signal to noise identification through pre-amplifier 30 with subsequent deconvolution at the first of six harmonics, i.e. 0.01, 0.03, 0.05, 0.07, 0.09 and 0.11 Hz, and subsequent current inputs at progressively higher frequencies followed by deconvolution at increasing harmonics were employed to fill out the full frequency plot. Thus, the deconvolution data output for each harmonic or fundamental frequency will occur along the amplitude trace 70 and the particular phase angle difference will be designated on phase angle trace 72. This particular pattern in the designated frequency range with normalized amplitude and phase angle in milliradians will be characteristic of a particular type of ore body; i.e. a particular makeup as to ores, other minerals, non-minerals, sulphides content, etc..

Figure 7:
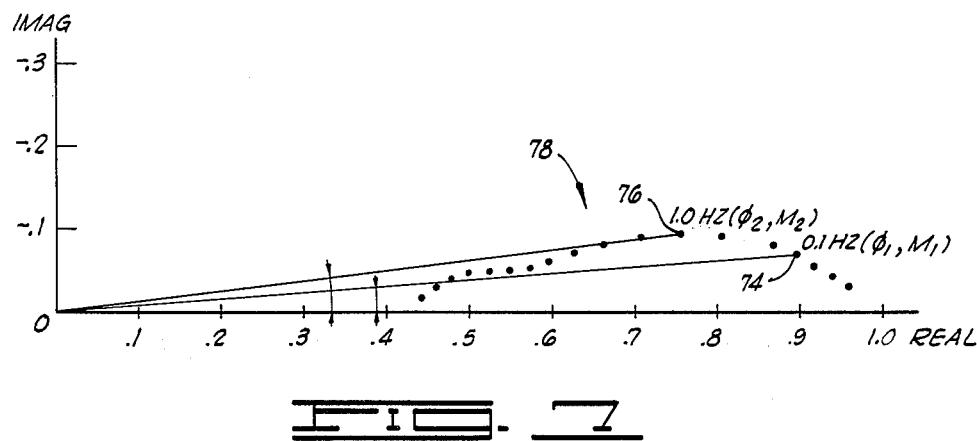
FIG. 7 is a polar coordinate graph of induced polarization magnitude and phase illustrating real and imaginary data values in the construction of real and imaginary complex resistivity plot.
Figure 8:
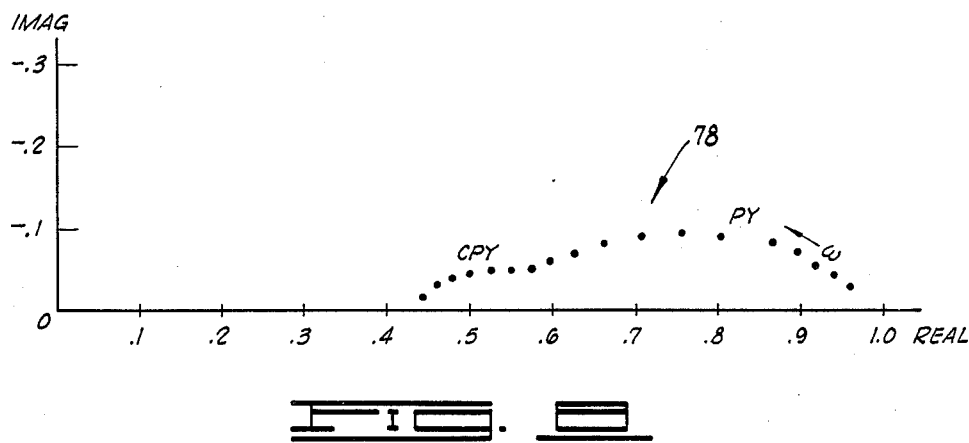
FIG. 8 is a real versus imaginary plot of induced polarization data as compiled in accordance with the present invention.

Still greater signature differentiation is enabled by transposing the data of the graph of FIG. 6 to a cartesian coordinate plot which is actually representative of complex A–C resistivity, i.e. the real and imaginary portions of the actual A–C impedance of the earth section under surveillance. Thus, taking first the 0.1 Hz data of FIG. 6, the phase difference $\phi$ designates the imaginary coordinate as set at the relative amplitude or magnitude distance 0.89 on the real coordinate to establish point 74 in the graph of FIG. 7. Similarly, taking the frequency at 1 Hz, the phase angle $\phi_2$ and magnitude $M_2$ combine to set coordinate point 76. In like manner, all of the points in curve 78 are established by transposition of the frequency data values along curves 70 and 72 to establish the characteristic signature such as shown more clearly in FIG. 8. This representation is simply a complex A–C resistance presentation or a designation by frequency of the real and imaginary impedance values for the particular survey. Empirical results establish that the particular signature 78 is a normal pyrite-chalcopyrite response.

Utilization of the amplitude versus phase angle output of FIG. 6 will also render the more conventional PFE (percent frequency effect) parameter as normally sought in induced polarization surveys. That is, for the frequency decade $\phi_1$ through $\phi_2$, selection of the mid-value $\phi_{\theta r}$ (dash-line 80) will enable calculation of PFE as follows:

$$PFE = \frac{M_1 - M_2}{M_2} \times 100 \qquad (10)$$

Figure 9:
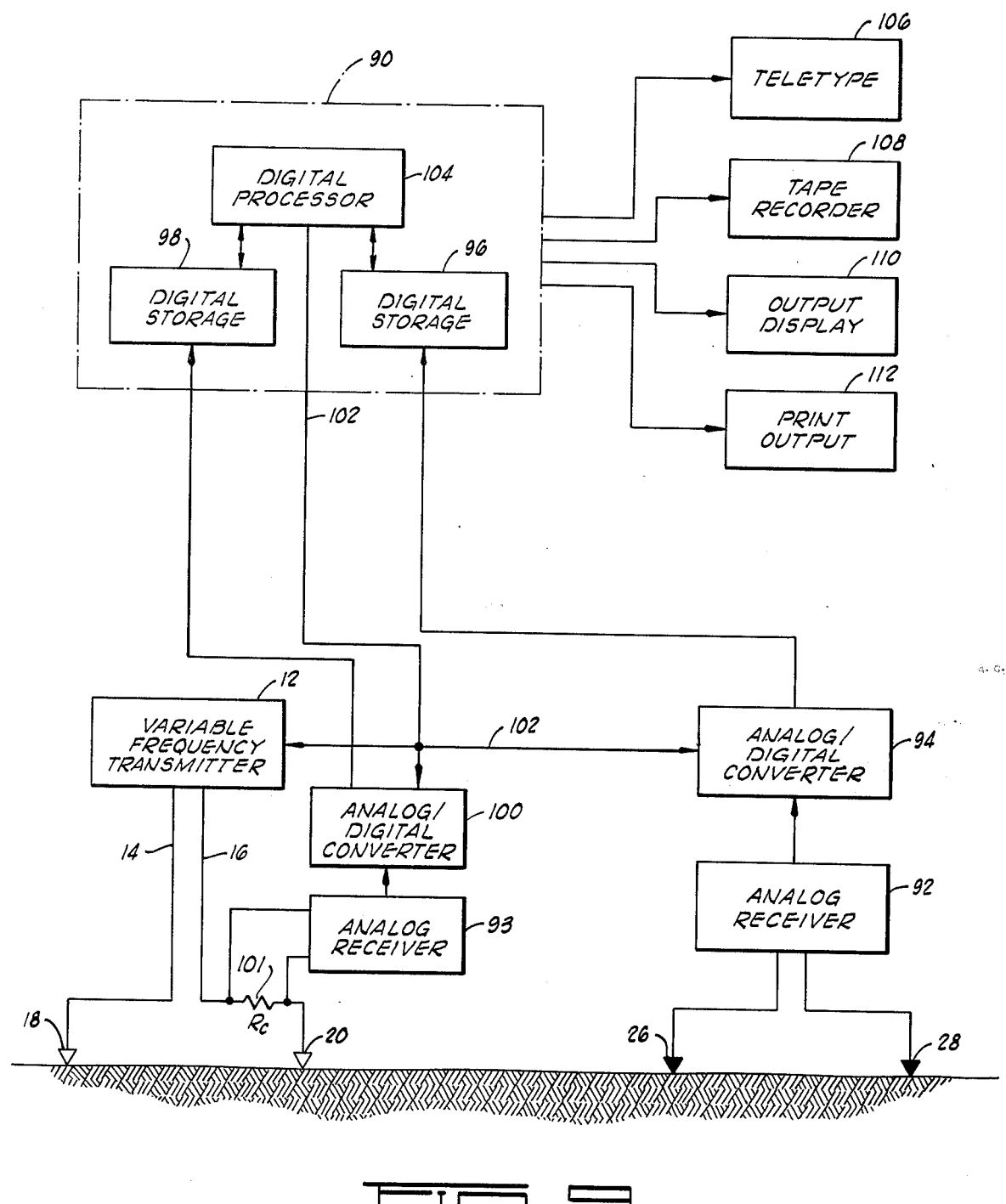
FIG. 9 is a block diagram of an induced polarization system utilizing digital data processing.

FIG. 9 illustrates in block form a system constructed in accordance with the present invention which utilizes a digital computer 90 in the field. The digital computer 90 in present designs is a mini-computer model PDP-8/E commercially available from Digital Equipment Corporation, and it is used with a hardware arithmetic option model EAE. This system includes 8K of core memory, and input analog to digital conversion circuitry is associated therewith. To insure adequate accuracy in digital processing of complex resistivity data, a maximum sample rate of 10,000 samples per second has been specified. To minimize noise, the received signal is (stacked and) averaged; a maximum number of 2048 samples of each spectrum is collected and averaged.

The field system of FIG. 9 illustrates the similar current electrodes 18 and 20 connected via respective conductors 14 and 16 to receive signal from the variable frequency transmitter 12 for current input to the earth. Potential readings are taken by potential electrodes 26 and 28 (or some selected plurality thereof in series) for input to a receiver 92, a conventional type of geophysical pre-amplifier. Output from receiver 92 may be passed through an analog/digital converter 94 of conventional type to provide input to computer 90; however, as previously stated, the type PDP-8/E computer includes such analog/digital circuitry in the input bank. Output from analog/digital converter 94 is then applied for input to computer 90 as by placement in a selected digital storage stage 96 therein, i.e. an integral portion of the computer 90.

The current electrode input to the earth from variable frequency transmitter 12 may also be controlled as to frequency and wave type in computer 90 as output from selected digital processor 104 to variable frequency transmitter 12. In order to maintain absolute control of the input current waveform, the input current waveform is recorded by analog receiver 93 as the signal across calibration resistor 101, and is digitized by analog to digital converter 100, for transformation and digital storage, to be later used for deconvolution with the transformed potential waveform in digital storage 96, thereby to remove all peculiarities of variable frequency in transmitter 12 and current input electrodes 18 and 20. All system timing as to transmitter input, receiver output and analog/digital conversion is effected under control of the master clock from computer 90 as applied via line 102 for input to the various stages requiring synchronization. The digital processor 104 within computer 90 functions in coaction with digital storage banks 96 and 98 and represents the internal computer equipment or circuitry which carries out the various arithmetic, logic and control functions in well-known manner.

Control and output of computer 90 may be effected variously. Thus, a teletype keyboard 106, e.g. the ASR-33 teletype unit, is utilized both for communication with the computer and for data printout in tabulated form. A tape recorder 108, preferably in cassette type record machine, receives data output from computer 90 for purposes of permanent storage to enable later laboratory analysis of signal content in accordance with other prescribed data processing routines. An output display 110, such as a Calcomp data printer, may be utilized to provide direct output of graphic displays, either cartesian or polar coordinate as required, and such output displays may be obtained directly in the field. Finally, other desired forms of print output may be effected by suitable selected printing mechanism 112 interfaced to computer 90 in conventional manner.

Processing operation of the digital computer 90 is illustrated by the general flow diagram of FIG. 10. This represents a primary step data flow which may function to perform processing in accordance with the invention. Basic input commands to the computer 90 are:

$F_L$ — frequency selection in Hz;
$A_{2N}$ — average input wave form $2^n$ times;
$C_m$ — process of taking fast Fourier transform of input with subsequent storage in calibrate buffer $m$;
T — taking of fast Fourier transform of received signal;
$D_m$ — deconvolution of data in temporary buffer (TEMBUF) with data in the calibrate buffer $b$ (BUF);
PP — printing output in polar form (magnitude and phase); and
PC — printing of output in cartesian form (real, imaginary).

The above command parameters vary where: L = 0.01, 0.1, 1.0 and 10.0; 1 is less than or equal to $m$ which is less than or equal to 6; and 0 is less than $n$ which is less than or equal to 11.

The program 120 as shown in general flow form in FIG. 10 designates a control point 122 for receiving input data and initiating processing, to be further described. The process is a cyclical operation carried out in general terms by a plurality of command decoder steps 124 each coacting with a respective variable selection step 126 and command unique operation step 128 to finally evolve printed output of the data in either polar or cartesian coordinates.

A command decoder decision stage 130 queries input from control point 122 as to whether or not it is a frequency selection command, and if so the data flow proceeds to fetch variable L stage 132 which processes the input data in accordance with the selected value L of frequency F. A subsequent flow stage 134 then sets the frequency marker equal to the particular value of L (as listed above). The decision stage 136 queries as to whether or not the command input is one for selection of average input wave form and, if so, selection stage 138 selects the particular variable $n$ and provides data output relating to the number of times $2^n$ that the input wave form is averaged. Thereafter, the wave form is digitized in operation step 140. In present practice the wave form is digitized with $2^{10}$ parts for addition $2^n$ times into the temporary buffer of computer 90. Output step 142 from step 140 provides for shifting the contents of the temporary buffer as a function of $n$ to maintain storage order and to complete the averaging of the stacked spectrum by dividing by $2^n$.

If the command is one pertaining to Fast Fourier Transform, or C decision stage 144 indicates affirmative, it initiates fetching of variable $m$ in step 146 to select a particular calibrate buffer 1–6 of computer 90.

Operation step 148 then performs the Fast Fourier Transform on the contents of the temporary buffer storage as designated in steps 148 and the FFT results are stored in both the buffer of L and M variables and the temporary buffer, as shown in step 150. Command decision stage 152 at its affirmative indication signifies carrying out of Fast Fourier Transform on the contents of the temporary buffer storage in stage 154, and this output result is stored in the temporary buffer once again in flow stage 156.

The deconvolution command decision stage 158, if affirmative, calls up the particular calibrate buffer $m$ in stage 160 and subsequent flow stage 162 functions to divide the contents of the temporary buffer by the contents of the buffers retaining results for L and M. Data derived in stage 162 is then stored in temporary buffer as per flow stage 156, and signification of completion is made via flow line 164 back through print complete stage 166 to control point 122.

Subsequent to completion of all data processing through decoder decision stages 130, 136, 144, 152 and 158, input command for PP may be received at decision stage 168 and affirmative indication initiates printing out of the first six odd harmonics of the temporary buffer in flow stage 170 to provide output data in terms of magnitude and phase angle difference with subsequent indication via return line 164 to signify print complete at stage 166. In like manner a PC command at decision stage 172 will provide affirmative to flow stage 172 to print out the first six odd harmonics of the temporary buffer in terms of real and imaginary values for actual complex A–C resistivity relationships. This completion too follows via return line 164 to print complete stage 166. In the event that command input traverses all of the way through command decoder stages 124 to provide a negative output from decision stage 172 on flow line 176, signification is made to print error stage 178 with subsequent indication to control point 122.

The program 120 when implemented through computer 90 of the type designated previously can be utilized in a field system for finding impulse response, i.e. the actual transfer impedance or the complex resistivity, of the ground under surveillance. Essentially, the process functions by deconvolving the Fast Fourier Transforms of the measured ground response voltage with the Fast Fourier Transform of the input current wave form. The data available then for plotting is either magnitude and phase or real and imaginary components which provide an indication of actual complex A-C resistivity. Further in-house data reduction may be carried out utilizing conventional program techniques to derive more conventional parameters such as apparent resistivities, percent frequency effect data, removal of electromagnetic coupling due to fences, pipe lines, etc.

Print output of the real and imaginary data values render plots which are most sensitive to differing mineral types. Thus, a system so implemented may be used in the field for differentiating between various combinations of clays, pyrite, and copper sulfides. Such plots enable the measuring of differing signatures due to various types of mineral and non-mineral effects and this data, in turn, is further utilized to determine percent mineralization by volume from the complex A–C resistivity data in order to construct in-situ average volumetric assay maps. The above data has been compiled using both surface and drill hole potential measurement.

The actual program list out relating to the generalized flow diagram of FIG. 10 is submitted herewith as Exhibit A to this specification. The program language is PAL-8 and is presently executed on computer Model PDP-8/E (DEC). In the program the first column group relates to core location, second column group to computer command (OCTAL), third group to computer command, and fourth group (if any) to remarks.

The foregoing discloses a novel induced polarization system capable of determining the actual transfer impedance of the ground, i.e. complex A–C resistivity of real and imaginary component, such that far greater data output is provided enabling more particular ascertainment of earth mineralization properties at a surveillance site. Output plot of the complex A–C resistivity in polar or cartesian coordinate form provides a plot of the real and imaginary components of the resistivity versus frequency over selected frequency interval such that highly characteristic signatures are established for each of many different types of rock or mineral formation encountered. Further signatory effects are noted from electromagnetic coupling effects as caused by pipe lines, fences and other anomalies such that correction for coupling effects can be readily interposed.

Changes may be made in the combination and arrangement of steps as heretofore set forth in the specification and shown in the drawings; it being understood that changes may be made in the embodiments disclosed without departing from the spirit and scope of the invention as defined in the following claims.

What is claimed is:

1. A method for induced polarization at a selected earth site utilizing spaced current input electrodes in combination with spaced potential sensing electrodes in conductive contact therewith, comprising the steps of:

energizing said current electrodes with a variable amplitude current input at predetermined time variable frequency over a selected duration;

sensing said input current with said potential electrodes to derive a potential output signal;

generating a Fourier transform of said current input signal over said duration;

generating a Fourier transform of said sensed potential output signal over said duration;

deconvolving the Fourier transform of said current input signal with the Fourier transform of said sensed potential signal to generate a deconvolution output over said duration, which deconvolution output indicates the complex resistivity in terms of potential magnitude and phase difference; and constructing an output plot of said deconvolution output signal to determine magnitude and phase at selected frequencies over said selected duration to generate a complex resistivity curve.

2. A method as set forth in claim 1 which is further characterized by the steps of:

generating said variable amplitude current input and sensing the potential thereof for a selected duration for each of a plurality of selected frequencies of amplitude variation;

separating the Fourier transformed components of each of the selected frequency current inputs and sensed potentials for deconvolution to derive a separate deconvolution output for each of said selected frequencies; and providing output indication of the magnitude and phase angle difference parameters for the sensed potential at each of the selected frequencies.

3. A method as set forth in claim 2 which is further characterized to include the step of:
providing a polar coordinate output of the sensed potential magnitude and phase for each of said plurality of said selected frequencies to generate indication of the real and imaginary components which are indicative of the actual complex A–C resistivity.

4. A method for discriminatory induced polarization surveying of a selected earth site, comprising the steps of:
generating a plurality of current inputs to the earth at each of selected different frequencies;
sensing the potential within the earth at a spaced earth location for each respective differing frequency current input;
Fourier transforming a replica signal for each of the plurality of current inputs and the sensed potential for each of the plural sensed potentials;
deconvolving each transformed current input with the respective transformed sensed potential to derive output indication of the complex A–C resistivity of the earth site at each selected frequency; and
comparing the complex A–C resistivity indication with established characteristic complex A–C resistivity signatures to determine type and relative quantities of mineralizations present at said earth site.

5. A method as set forth in claim 4 wherein said current generating and potential sensing steps are conducted along an earth borehole.

6. A method as set forth in claim 4 wherein said current generating and potential sensing steps are conducted at spaced locations along the earth surface.

7. A method as set forth in claim 4 wherein said characteristic complex A–C resistivity signatures comprise prior established complex resistivity data derived over selected frequency range and input duration which were empirically proven to establish specific mineralization.

8. A method as set forth in claim 4 which is further characterized in that:
said steps of Fourier transforming, deconvolving and outputting complex A–C resistivity indications are effected by a specifically programmed digital computer.

* * * * *